United States Patent Office 3,036,692
Patented May 29, 1962

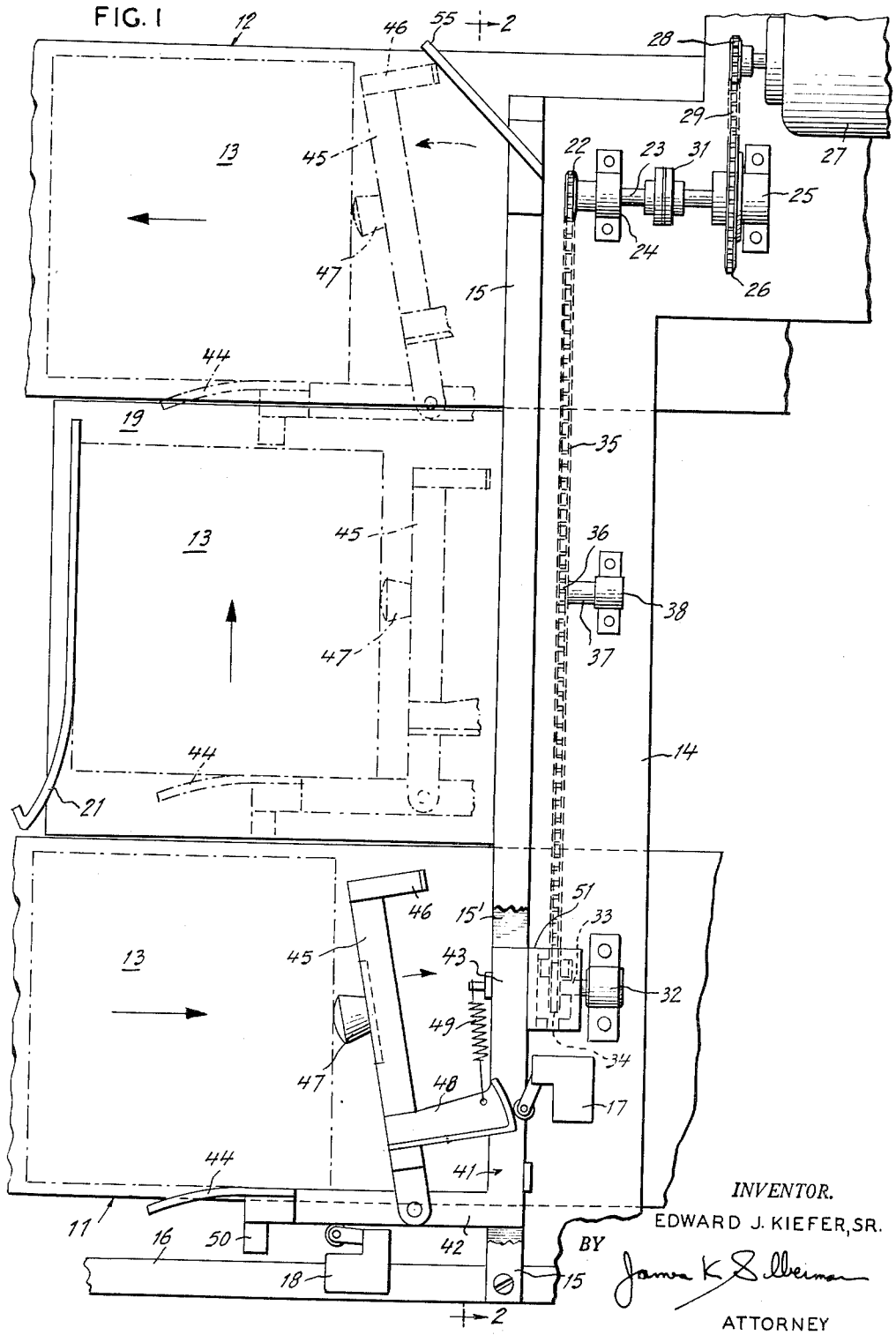

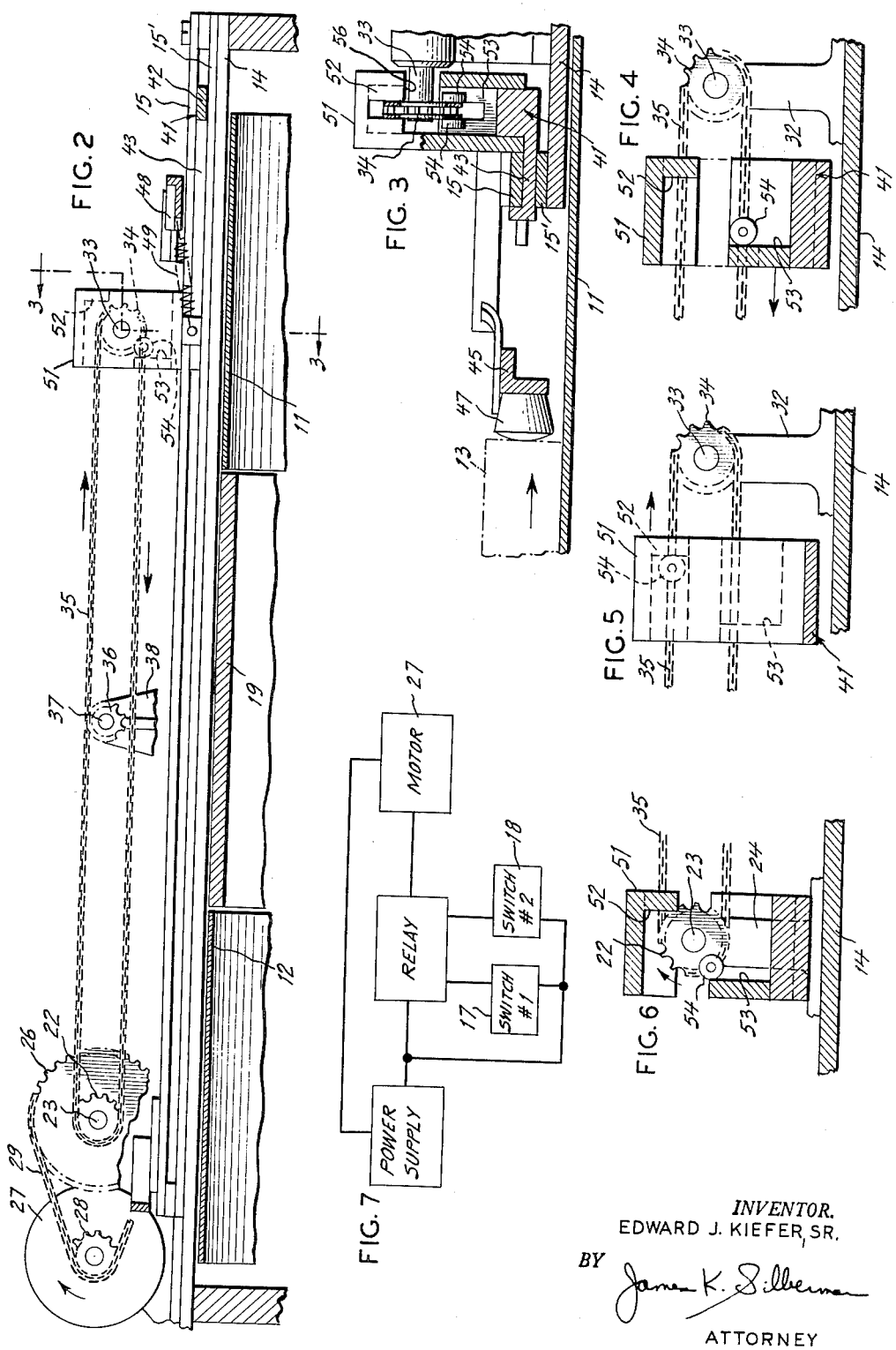

3,036,692
PARTS TRANSFER MECHANISM
Edward J. Kiefer, Sr., 122—07 Metropolitan Ave.,
Kew Gardens, N.Y.
Filed Dec. 27, 1960, Ser. No. 94,659
4 Claims. (Cl. 198—21)

This invention relates generally to a parts transfer mechanism capable of transferring parts or the like between continuously moving conveyors without interrupting the flow of parts. More particularly, the invention relates to the automatic transfer of parts or trays of parts between two conveyors which operate in displaced, parallel paths but run in opposite directions.

Diverse methods are used to transfer parts between oppositely running, parallel conveyors. The most obvious method is to have the parts manually transferred from one conveyor to another. However, if the parts are being transported on the first conveyor in uninterrupted sequence, the constant presence of an operator is required. It is well known that the efficiency of an operator is limited by human speed and fatigue. Furthermore, the presence of an operator creates an expense not compensated for by productivity.

Mechanization of displacing parts and reversing the direction of their flow on conveyors has been accomplished by special design of the conveyor system. If the conveyor path forms an elongated oval, the sides of the oval will be parallel, displaced from each other and run in opposite directions. However, this special design involves a much higher conveyor cost and reduces the versatility of the conveyor. The conveyor also requires a larger floor area since the parallel paths must be sufficiently displaced from each other to allow for the minimum radius of curvature of the end sections of the oval.

Accordingly, it is an object of this invention to provide a mechanism which will automatically transfer parts between parallel conveyors.

It is another object of this invention to provide a mechanism which will automatically transfer parts between parallel conveyors which are running in opposite directions.

A still further object of this invention is to provide a mechanism which will automatically transfer parts between conveyors which are spaced at any distance from each other.

Other objects and advantages of the invention will be apparent from the specification.

Generally speaking, in accordance with the invention, parts or trays of parts travel on a first conveyor. As each part or tray of parts approaches the transfer mechanism, which may be near the end of the conveyor, the part or tray engages a yieldable pick-up mechanism. The travel of the part or tray against the pick-up mechanism causes the pick-up mechanism to engage a switch and close a circuit which activates the transfer mechanism. The transfer mechanism carries the part or tray along a path perpendicular to the first conveyor. It positions the part or tray on a second conveyor which is displaced from the first conveyor and is traveling in a direction opposite to that of the first conveyor. The second conveyor then carries the part or tray with it in its direction of travel. The transfer mechanism is thereupon returned to its original position to await the arrival of the next part or tray. Large parts may be placed directly on the conveyor and transferred by the transfer mechanism. For conveying and transferring smaller or odd shaped parts, it may be necessary to place them in trays.

For a better understanding of the invention, reference is had to the following description taken in connection with the accompanying drawing, and its scope will be pointed out in the appended claims.

In accompanying drawing:

FIG. 1 is a plan view of the invention showing the pick-up arm in three positions during its travel between parallel conveyors.

FIG. 2 is a sectional view taken along line 2—2 of FIG. 1 showing the pick-up arm driving mechanism.

FIG. 3 is a sectional view taken along line 3—3 of FIG. 2.

FIG. 4 is a sectional view showing the mechanism used to drive the pick-up arm near the start of the transfer cycle.

FIG. 5 is a sectional view showing the mechanism used to drive the pick-up arm near the end of the transfer cycle.

FIG. 6 is a sectional view showing the mechanism used to drive the pick-up arm at mid-cycle as the pick-up arm is reversed in its direction of travel.

FIG. 7 is a block diagram of a relay circuit used to start and stop the transfer cycle.

Referring now to FIG. 1, two continuous conveyor belts 11 and 12 are positioned parallel to each other and run in opposite directions as indicated by the arrows. The conveyor belts are displaced from each other at any desired distance. A tray 13, containing parts or the like, has been positioned on conveyor belt 11 at some previous loading station, and traveled thereon. The mechanism to transfer tray 13 from conveyor belt 11 to conveyor belt 12 is located at any desired position along the conveyor belts. In order to fully utilize the conveyor belts, the transfer mechanism would, most likely, be placed near the ends of the conveyor belt system.

A base plate 14, positioned directly over the conveyor belts, forms the base of the transfer mechanism. Attached to plate 14 are upper and lower guide bars 15 and 15′ which extend the entire length of the transfer mechanism. A member 16 is also mounted to plate 14 at one end of guide bars 15 and 15′ and extends perpendicularly thereto. Member 16 therefore extends parallel to conveyor belt 11, from which transfer of tray 13 occurs. Mounted to plate 14, in the area of conveyor belt 11 is a first switch 17. Mounted to member 16, adjacent the outside edge of conveyor belt 11 is a second switch 18. Extending from plate 14 is a table 19 positioned between conveyor belts 11 and 12 in the plane of the top of the conveyor belts. Table 19 has a curved guide member 21 mounted thereon.

A motor 27, which supplies the power to the transfer mechanism, is mounted to plate 14 in the area of conveyor belt 12. A sprocket 28 is attached to the end of the motor shaft. Two supports 24 and 25 are positioned over conveyor belt 12 and are mounted to plate 14. The supports have a shaft 23 journalled therethrough. To prevent jamming of motor 27 if the transfer mechanism jams during the transfer cycle, a slip clutch 31 is interposed on shaft 23 between supports 24 and 25. A second sprocket 26 is mounted on shaft 23 and is driven by sprocket 28 through a continuous chain 29. Mounted to an end of shaft 23 is a drive sprocket 22.

A third support 32 is mounted to plate 14 over conveyor belt 11 and has a shaft 33 journalled therein. A driven sprocket 34 is attached to the end of shaft 33 and is driven by drive sprocket 22 through a continuous chain 35 which passes over both sprockets. An idler sprocket 36 is attached to a shaft 37 which is journalled in a fourth support 38 mounted to plate 14 midway between supports 24 and 32. Continuous chain 35 passes over idler sprocket 36 which reduces the amount of sag in the long expanse of chain.

Forming part of the pick-up arm, a hoe 41, consisting of legs 42 and 43, is positioned so that leg 43 rides between upper and lower guide bars 15 and 15' (FIG. 3). Extending from the end of leg 42 is a guide rod 44. An angular bar 45 is pivoted at one end to leg 42 and has a limiting bar 46 attached perpendicularly at its other end. A bumper 47 is attached to angular bar 45 along its center section. A switch arm 48 is also attached to angular bar 45 in a position to contact switch 17 and extends parallel to limiting bar 46. A spring 49 is attached between switch arm 48 and leg 43 to maintain the position of angular bar 45. A shoe 50 is attached at the end of leg 42 and rides on conveyors 11 and 12 and table 19 to support leg 42 as hoe 41 traverses the conveyor belts.

Referring now to FIG. 2, a carriage box 51, having two oppositely disposed drive surfaces 52 and 53, is mounted to hoe 41. A drive cylinder 54 is attached to continuous chain 35. Drive surfaces 52 and 53 are disposed to be contacted by drive cylinder 54. Referring to FIG. 3, carriage box 51 is positioned around continuous chain 35, drive surfaces 52 and 53 having cutouts which allow continuous chain 35 and sprockets 22, 34 and 36 to pass therethrough. Carriage box 51, being attached to leg 43, is supported thereby. Leg 43 is supported and guided throughout its travel by being disposed between upper and lower guide bars 15 and 15' which are secured to base plate 14. Carriage box 51 is also formed with a slot 56 in its rear face which allows the carriage box to pass over shafts 33, 37 and 23 during its travel.

During operation, conveyor belts 11 and 12 move continuously in the directions indicated in FIG. 1. Large parts, which can be placed directly on the conveyor belt, or smaller or odd shaped parts in tray 13 are transported on conveyor belt 11 from some distant loading station. As tray 13 approaches the transfer mechanism, the tray is guided by guide rod 44 and along leg 42. Any misalignment or skew of tray 13 is rectified as it is guided along leg 42. When tray 13 contacts bumper 47, angular bar 45 is rotated in the direction indicated by the arrow, against the tension of spring 49. Switch arm 48 engages switch 17, starting motor 27 through the circuit shown schematically in FIG. 7. This starts the transfer cycle.

In FIG. 2, motor 27, rotating as shown, drives continuous chain 35, through cooperation of sprockets 26 and 28 with continuous chain 29, in a clockwise direction. Drive cylinder 54 engages lower drive surface 53 of cartridge box 51 and causes the carriage box and hoe 41 to which it is attached, to traverse the conveyor belts guided by upper and lower guide bars 15 and 15'.

In FIG. 1, leg 42 engages the side of tray 13 and slides it from conveyor belt 11 across table 19 to conveyor belt 12. Any misalignment of tray 13, caused as it is picked up by hoe 41, is corrected as tray 13 engages and slides along guide member 21. The position of the transfer mechanism and tray 13, as they cross table 19, is indicated in phantom in FIG. 1. As tray 13 is brought into position on conveyor belt 12, limiting bar 46 engages an eject bar 55 projecting from upper guide bar 15. Angular bar 45 is thereby rotated in a counterclockwise direction causing tray 13 to be moved in the direction of travel of conveyor belt 12. The conveyor belt carries away tray 13, thereby allowing the transfer mechanism to freely return to its original position. The position of the transfer mechanism when it has completed a half-cycle and tray 13 as it commences its travel along conveyor belt 12 is also shown in phantom in FIG. 1.

FIG. 4 shows how the motion of continuous chain 35 is transmitted to carriage box 51. Drive cylinder 54 contacts lower drive surface 53 as hoe 41 transfers tray 13 from conveyor belt 11 to conveyor belt 12.

When transfer of tray 13 is complete, the tray being positioned on and carried along by conveyor 12, carriage box 51 reaches the position shown in FIG. 6. Drive cylinder 54 bears against lower drive surface 53 until carriage box 51 is positioned over drive sprocket 22. As drive cylinder 54 moves around drive sprocket 22, it moves out of contact with lower drive surface 53 and continues on until it engages upper drive surface 52. As drive cylinder 54 continues to move in contact with upper drive surface 52, carriage box 51 and hoe 41 to which it is attached, will be returned as shown in FIG. 5 to its original or rest position as shown in FIG. 2.

Referring again to FIG. 1, when hoe 41 is returned to its original position, leg 42 will contact switch 18. Switch 18, through the relay circuit shown schematically in FIG. 7, stops motor 27, which ends the transfer cycle, and allows hoe 41 to remain in that position until the next tray or part transferred starts the cycle again by causing switch arm 48 to contact switch 17. When hoe 41 has completed its return, carriage box 51 is positioned directly over driven sprocket 34 in a position similar to the relationship between carriage box 51 and drive sprocket 22 shown in FIG. 6. In the rest position, drive cylinder 54 will be out of contact with upper drive surface 52 and will be able to engage lower drive surface 53 at the start of the next cycle.

FIG. 7 schematically represents the delay circuit which starts and stops the transfer mechanism. When switch 17 is contacted by switch arm 48, the relay is closed, completing the circuit and starting motor 27. As hoe 41 traverses from conveyor belt 11 to 12, switch arm 48 releases switch 17, but the relay remains closed so that motor 27 may continue to operate. The relay stays closed until hoe 41 returns to its original position and leg 42 contacts switch 18. Switch 18 thereupon opens the relay, breaking the circuit and stopping motor 27. As hoe 41 returns to the rest position, switch arm 48 is kept out of contact with switch 17 by spring 49, and the cycle will not again be repeated until the next tray 13 causes switch arm 48 to contact switch 17.

Referring generally to FIG. 1, conveyor belts 11 and 12 operate at the same speed. The speed of operation of continuous chain 35, which causes the transfer of tray 13, is chosen to allow hoe 41 to travel through a complete transfer cycle and stop at its rest position before a next tray 13 has traveled sufficiently far along on conveyor belt 11 to engage guide rod 44. Proper selection of the relative sizes of sprocket wheels 26 and 28 allows for any desired speed step-down of motor 27.

While there has been described a preferred embodiment of this invention, it will be clear to those skilled in the art that modifications and changes may be made without departing from the spirit and scope of the invention.

What is claimed is:

1. A mechanism to transfer, from a first conveyor to an oppositely moving, parallel second conveyor, an object having a substantially rectangular base and travelling in substantial alignment on the first conveyor, the conveyors having substantially coplanar conveying surfaces comprising:

(a) a fixed table disposed between the first and second conveyors having its uppermost surface coplanar with the conveying surfaces, (b) a movable pick-up arm mounted over and extending along the first conveyor in the direction opposite to the direction of travel of the first conveyor, (c) power operated means cooperating with said pick-up arm for moving said pick-up arm in a traversing direction from its position over the first conveyor, across said table to the second conveyor and returning said pick-up arm to its position over the first conveyor, (d) first switch means cooperating with said power operated means to commence and maintain operation of said power operated means until said pick-up arm returns to its position over the first conveyor, (e) second switch means cooperating with said power operated means and operated by said pick-up arm to effect the cessation of said power operated means when said pick-up arm returns to its position over the first conveyor, and (f) a spring mounted guide pivoted to said pick-up arm and adapted to actuate said first switch means when said guide is deflected to a position substantially perpendicular to said pick-up arm by the object, whereby the object being transferred will be maintained in alignment by said pick-up arm and said spring mounted guide during transfer.

2. The structure defined in claim 1 and further including a stationary guide mounted on said fixed table and extending parallel to the direction of transfer to slidably engage one side of the object to maintain it in substantial alignment as the object is caused to traverse said fixed table by said pick-up arm.

3. The structure defined in claim 1 and further including an ejecting bar mounted over the second conveyor and adapted to be engaged by said spring mounted guide to eject the object from contact with said spring mounted guide while commencing its travel in the direction of travel of the second conveyor.

4. The structure defined in claim 1 wherein said power operated means comprises a mechanism for converting circular motion in one direction to lineal back and forth motion comprising a base plate, a pair of sprocket supports spaced at any distance, sprockets journalled in said sprocket supports, rotary drive means attached to said base plate for driving one of said sprockets, a continuous chain passing over said sprockets, a drive cylinder attached to said continuous chain, a carriage box positioned over said continuous chain and slidably contacting said base plate, said carriage box having two oppositely disposed vertical surfaces, the lower of said vertical surfaces positioned to be contacted by said drive cylinder when said drive cylinder travels in one lineal direction with said continuous chain, the upper of said vertical surfaces positioned to be contacted by said drive cylinder when said drive cylinder travels in the opposite lineal direction with said continuous chain, said vertical surfaces horizontally and vertically displaced from each other to allow said drive cylinder to disengage one of said surfaces when said carriage box is positioned over one of said sprockets and engage the other of said surfaces to drive said carriage box in an opposite direction.

References Cited in the file of this patent
UNITED STATES PATENTS

| | | |
|---|---|---|
| 1,929,204 | Jeffrey et al. | Oct. 3, 1933 |
| 2,681,130 | Atwood | June 15, 1954 |
| 2,933,929 | Rosendahl | Apr. 26, 1960 |